Patented Dec. 16, 1941

2,266,228

UNITED STATES PATENT OFFICE 2,266,228

PROCESS OF MANUFACTURING AMINOHAL-OGEN-NITROBENZENE SULPHONIC ACIDS

Georg Matthaeus, Wolfen, Kreis Bitterfeld, Germany, assignor to General Aniline & Film Corporation, a corporation of Delaware No Drawing. Application September 13, 1938, Serial No. 229,703. In Germany September 17, 1937

1 Claim. (Cl. 260—508)

This invention relates to the manufacture of 1-amino-2-chloro (or bromo)-4-(or 6)-nitrobenzene-6(or 4)-sulphonic acid by causing the corresponding 4(or 6)-nitrobenzene-6(or 4)-sulphonic acid, containing in 1-position a substituent which can be exchanged by the action of ammonia and in 2-position a chlorine or bromine atom, to react with ammonia. That this is possible is the more remarkable since benzene nuclei so strongly negatively loaded would be expected to undergo a more deeply seated exchange. For example, by treatment of 3.4-dichloro-6-nitrobenzene-1-sulphonic acid with ammonia there is substitution both for a chlorine atom and for a sulphonic acid group.

The products of the invention are valuable in the manufacture of azo dyes.

The 1-amino-2-bromo-6-nitrobenzene-4-sulphonic acid and the 1-amino-2-bromo-4-nitrobenzene-6-sulphonic acid are obtained similarly to the chlorine derivatives.

For example, 294 parts by weight of sodium-1,2-dichloro-4-nitrobenzene-6-sulphonate and about 3 to 5 times this quantity of concentrated ammonia are heated together for 30 hours at 90 to 100° C. The crude product is purified by crystallization from water and treatment with animal charcoal. The yield is nearly quantitative. The product has the formula

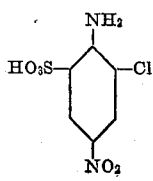

When using 1,2-dichloro-6-nitrobenzene-4-sulphonic acid there is obtained under like conditions and in the same good yield the 1-amino-2-chloro-6-nitrobenzene-4-sulphonic acid which has the formula

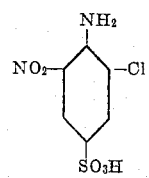

It is obvious that my invention is not limited to the foregoing example or to the specific details given therein. As already indicated above, the corresponding 1-amino-2-bromo-6-nitrobenzene-4-sulphonic acid and 1-amino-2-bromo-4-nitrobenzene-6-sulphonic acid, likewise, can be produced when subjecting sodium-1,2-dibromo-4-nitrobenzene-6-sulphonate or 1,2-dibromo-6-nitrobenzene-4-sulphonate to a treatment with ammonia, while heating to a temperature of about 100° C. The reaction temperature may be raised within certain limits depending from the concentration of the ammonia solution, the best working conditions being easily determinable by a simple experiment.

What I claim is:

The process which comprises heating a halogeno-nitrobenzene-sulphonic acid of the group consisting of 1,2-dichloro- and 1,2-dibromo-4-nitrobenzene-6-sulphonic acid and 1,2-dichloro- and 1,2-dibromo-6-nitrobenzene-4-sulphonic acid with ammonia.

GEORG MATTHAEUS.